United States Patent
Zhang et al.

(10) Patent No.: US 6,721,279 B1
(45) Date of Patent: Apr. 13, 2004

(54) METHOD AND APPARATUS FOR ADAPTIVE PCM LEVEL ESTIMATION AND CONSTELLATION TRAINING

(75) Inventors: Xuming Zhang, Mission Viejo, CA (US); Sverrir Olafsson, Reykjavik (IS)

(73) Assignee: PCTEL, Inc., Chicago, IL (US)

( * ) Notice: Subject to any disclaimer, the term of this patent is extended or adjusted under 35 U.S.C. 154(b) by 0 days.

(21) Appl. No.: 09/496,843

(22) Filed: Feb. 2, 2000

Related U.S. Application Data

(60) Provisional application No. 60/118,397, filed on Feb. 2, 1999.

(51) Int. Cl.[7] ............ H04M 1/24; H04M 3/08; H04M 3/22
(52) U.S. Cl. ............ 370/252; 370/522; 370/523
(58) Field of Search ............ 370/522, 523; 375/222, 295, 261, 285, 223, 227, 358, 242

(56) References Cited

U.S. PATENT DOCUMENTS

| | | | |
|---|---|---|---|
| 4,253,184 A | * 2/1981 | Gitlin et al. | ............ 375/232 |
| 4,730,312 A | 3/1988 | Johnson et al. | |
| 5,048,054 A | 9/1991 | Eyuboglu et al. | |
| 5,274,670 A | * 12/1993 | Serizawa et al. | ............ 375/231 |
| 5,325,425 A | * 6/1994 | Novas et al. | ............ 379/100.14 |
| 5,398,234 A | 3/1995 | O'Connell et al. | |
| 5,495,526 A | * 2/1996 | Cesaro et al. | ............ 375/286 |
| 5,506,956 A | 4/1996 | Cohen | |
| 5,509,036 A | 4/1996 | Nakata | |
| 5,535,244 A | 7/1996 | Nakatsu et al. | |
| 5,541,967 A | 7/1996 | Gluska et al. | |
| 5,590,161 A | 12/1996 | Meyn et al. | |
| 5,598,435 A | 1/1997 | Williams | |
| 5,623,516 A | 4/1997 | Brownlie et al. | |
| 5,687,199 A | 11/1997 | Dupuy | |
| 5,729,226 A | 3/1998 | Betts et al. | |
| 5,754,594 A | 5/1998 | Betts et al. | |
| 5,761,247 A | 6/1998 | Betts et al. | |
| 5,764,694 A | * 6/1998 | Rahamim et al. | ............ 370/286 |
| 5,784,405 A | 7/1998 | Betts et al. | |
| 5,812,075 A | 9/1998 | Betts et al. | |
| 5,822,359 A | 10/1998 | Bruckert et al. | |
| 5,822,371 A | 10/1998 | Goldstein et al. | |
| 5,825,816 A | 10/1998 | Cole et al. | |
| 5,825,823 A | * 10/1998 | Goldstein et al. | ............ 375/286 |
| 5,838,724 A | 11/1998 | Cole et al. | |
| 5,875,229 A | * 2/1999 | Eyuboglu et al. | ............ 379/1.04 |
| 6,023,493 A | 2/2000 | Olafsson | |
| 6,067,319 A | * 5/2000 | Copeland | ............ 704/226 |
| 6,081,567 A | 6/2000 | Olafsson | |
| 6,122,609 A | * 9/2000 | Scalart et al. | ............ 379/386 |
| 6,128,276 A | * 10/2000 | Agee | ............ 375/232 |
| 6,178,200 B1 | * 1/2001 | Okunev et al. | ............ 375/222 |
| 6,185,195 B1 | * 2/2001 | Leung | ............ 370/208 |

OTHER PUBLICATIONS

ITU–T V.90 Recommendation.*

* cited by examiner

Primary Examiner—Huy D. Vu
Assistant Examiner—Daniel Ryman
(74) Attorney, Agent, or Firm—Farjami & Farjami LLP

(57) ABSTRACT

Systems compensate for the presence of digital impairments using adaptive constellation techniques. Sample magnitudes are estimated from received samples transmitted during a training period using an algorithm based on minimizing the sum of squares of the estimated errors, after which a suitable constellation is derived. In one embodiment, an optimum least-squares algorithm is employed. In an alternate embodiment, a least mean squares (LMS) or normalized LMS algorithm is performed.

20 Claims, 7 Drawing Sheets

METHOD AND APPARATUS FOR ADAPTIVE PCM LEVEL ESTIMATION AND CONSTELLATION TRAINING

CROSS-REFERENCES TO RELATED APPLICATIONS

This application claims the benefit of U.S. Provisional Application No. 60/118,397, filed Feb. 2, 1999, hereby incorporated by reference.

TECHNICAL FIELD

The present invention relates, generally, to modem technology and, more particularly, to adaptive constellation techniques for improving the performance of pulse code modulation (PCM) modems using adaptive constellation design.

BACKGROUND ART AND TECHNICAL PROBLEMS

Modem systems operating at about 56 kbps were developed to take advantage of the fact that ISPs are connected to the PSTN through a digital line rather than a twisted pair of copper wires terminating at the central office. That is, referring now to FIG. 1, an ISP 120 generally comprises a server 102 coupled to a digital modem 144 which is connected to PSTN 108 through a digital line 134 and is capable of transmitting data at about 64 kbps. Data is transmitted to central office 110 over a digital line 132, and then over the analog local line 134 to an analog modem 112 associated with a user system 114 (e.g., a PC or the like).

PSTN 108 comprises assorted networks and components used to provide, among other things, standard telephone service. PSTN 108 might include foreign exchange services (FX), local exchange carriers (LECs), inter-exchange carriers (IECs), digital loop carriers (DLCs) and the like. As the parameters of PSTN 108 and a line card coder/decoder (codec) provided within central office 110 are dictated by network specifications (e.g., the use of $\mu$-law or A-law encoding), ISP modem 144 is configured to transmit digital data in such a way as to fully exploit its digital connection to the network. See, e.g., the ITU-T V.90 specification, hereby incorporated by reference.

Digital communication systems may employ a number of initialization, training, and adaptive learning protocols that are designed to equalize the channel distortions, optimize the data transmission speed, reduce transmission errors, and improve the quality of the received signal. For example, the current generation of pulse code modulation (PCM) modems, e.g., modem systems compliant with ITU-T Recommendation V.90, perform an initial training procedure to adaptively adjust the equalizer structure resident at client-side analog modem 112 (APCM).

V.90 modem systems perform an initial two-point training procedure during which one constellation signal point (based on a particular $\mu$-law or A-law level) is transmitted as a sequence having positive and negative signs. The DPCM transmits the two-point training sequence to the APCM, and the APCM analyzes the received signal to determine the channel characteristics and to adjust its equalizers. After performing this two-point training, a digital impairment learning (DIL) procedure is performed.

FIG. 2 illustrates a typical V.90 modem downstream transmission channel 200 over which such a training sequence may be sent. The signal b(n) (202) may represent a sequence of digital symbols, e.g., 8-bit codewords, that are to be transmitted by a DPCM transmitter 204, where "n" represents the time index for the transmitted symbol.

A number of digital impairments 208, such as robbed bit signaling (RBS) and digital pads, may be present within the digital network channel associated with DPCM 204. A digital to analog conversion occurs at a PCM codec 212 to facilitate transmission to the end user over an analog loop as described above. Analog impairments 216, such as nonlinear and linear distortion, may be associated with the analog loop and/or any number of analog processing components. Furthermore, in practical applications, additive noise 218 may be introduced to the analog signal before the analog signal is received by the APCM receiver 220, which produces a series of estimated symbols b(n) (222).

Digital impairments significantly limit the performance of PCM modem receiver 220. Digital impairment includes, for example, digital pads and robbed-bit signaling (RBS). Since reliable operation of a PCM modem is predicated on PCM receiver 220 knowing which levels digital transmitter 204 is sending out, PCM receiver 220 must detect what type of digital impairment has been encountered on a particular telephone line, or estimate all available PCM levels. In typical V.90 systems, RBS-altered symbols are periodic in nature based on the symbol count; e.g., RBS may occur every six or twelve symbols. Furthermore, the effect of RBS is deterministic but unknown to the APCM, while digital pads cause a constant, deterministic, and level-dependent (nonlinear) effect.

Prior art modem systems may compensate for linear analog impairments, such as amplitude and phase distortions, with well known linear equalization techniques. Such techniques, however, may not adequately compensate for the presence of digital impairments, and may therefore alter the level associated with the predetermined training point. Consequently, the initial training procedure performed by known V.90 modem systems do not provide the most efficient and effective result.

Methods are therefore needed which overcome these and other limitations of the prior art.

SUMMARY OF THE INVENTION

The present invention provides systems for compensating for the presence of digital impairments using adaptive constellation techniques. In accordance with various aspects of the present invention, actual sample magnitudes are estimated from received samples transmitted during a training period using an algorithm based on minimizing the sum of squares of the estimated errors. After which a suitable constellation is derived. In one embodiment, an optimum least-squares algorithm is employed. In an alternate embodiment, a least mean squares (LMS) or normalized LMS algorithm is performed.

BRIEF DESCRIPTION OF THE DRAWING FIGURES

The subject invention will hereinafter be described in conjunction with the appended drawing figures, wherein like numerals denote like elements, and:

DETAILED DESCRIPTION OF PREFERRED EXEMPLARY EMBODIMENTS

The present invention provides methods and apparatus for adaptive constellation training. In general, as will be described in further detail below, sample magnitudes are estimated from received samples transmitted during a training period using an algorithm based on minimizing the mean squares of estimated level errors.

As a preliminary matter, the present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, look-up tables, and the like, which may carry out a variety of functions under the control of one or more microprocessors or other control devices. In addition, those skilled in the art will appreciate that the present invention may be practiced in any number of data communication contexts and that the modem system described herein is merely one exemplary application for the invention. Further, it should be noted that the present invention may employ any number of conventional techniques for data transmission, training, signal processing and conditioning, and the like. Such general techniques that may be known to those skilled in the art are not described in detail herein.

Overview

As discussed above in the connection with FIG. 2, analog and digital impairments affect the characteristics of signals transmitted by V.90 modem systems. The affected analog signal is eventually obtained by APCM receiver 220. During the initial training interval, a predetermined training sequence is transmitted by DPCM transmitter 204 and received and processed by APCM receiver 220 such that APCM receiver 220 can adaptively train its equalizers.

Figure 3:
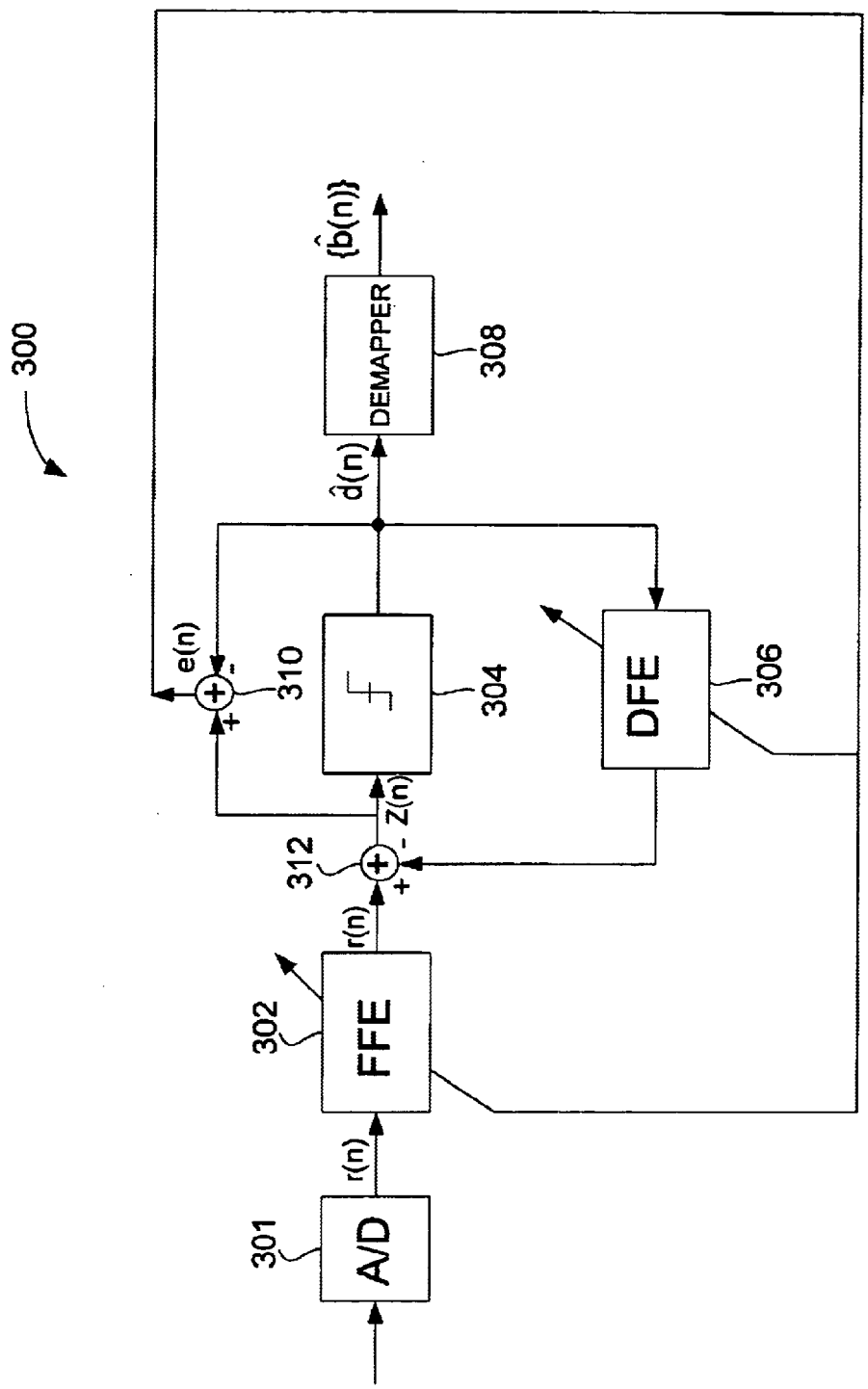
FIG. 3 shows an exemplary ADPCM receiver in accordance with the present invention.
Figure 7:
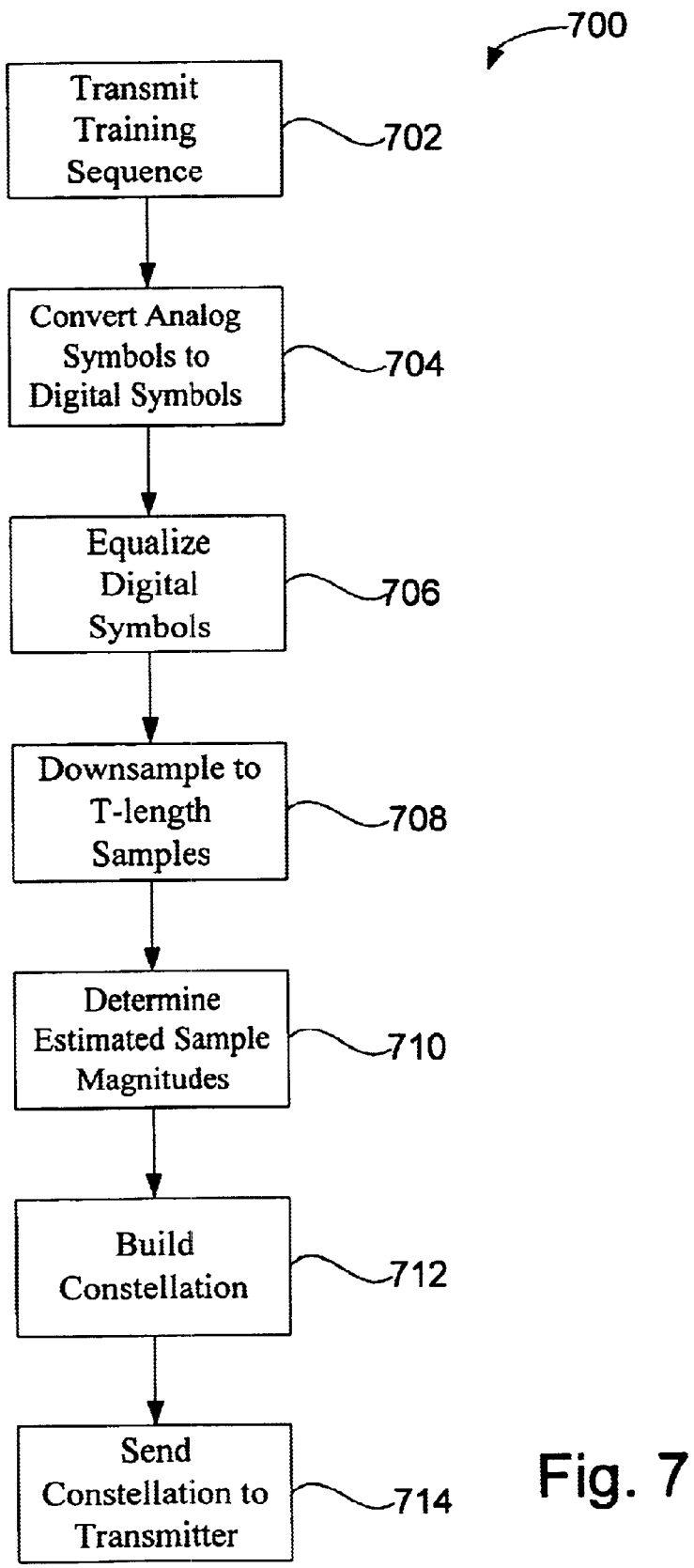
FIG. 7 shows a flow chart depicting a method in accordance with one aspect of the present invention.

FIG. 3 presents a general block diagram depicting a portion of an exemplary APCM receiver 300 that is configured in accordance with the principles of the present invention, and FIG. 7 is a flow diagram of process 700 that may be performed by the modem system to provide PCM level estimation at APCM receiver 300. Process 700 may begin with a task 702, which causes DPCM 204 to transmit a training sequence of digital symbols.

In a preferred embodiment, the digital impairment learning sequence (DIL) transmitted during training corresponds to each of the 256 PCM levels, wherein the training sequences are sent in blocks of $L_i$ samples (where $L_i$ is the length of the DIL corresponding to PCM level i.) The block length is preferably a multiple of 6. The training sequence for each block is preferably random (i.e., with respect to the signs of the symbols), although other schemes may be used. The sequence can be repeated for all blocks, or each block may use a different sequence of signs. In the case of an LMS scheme (described below), it is advantageous to include a reference pointer periodically in the transmitted samples.

For more information regarding an exemplary digital impairment learning sequence, see the V.90 specification.

Figure 1:
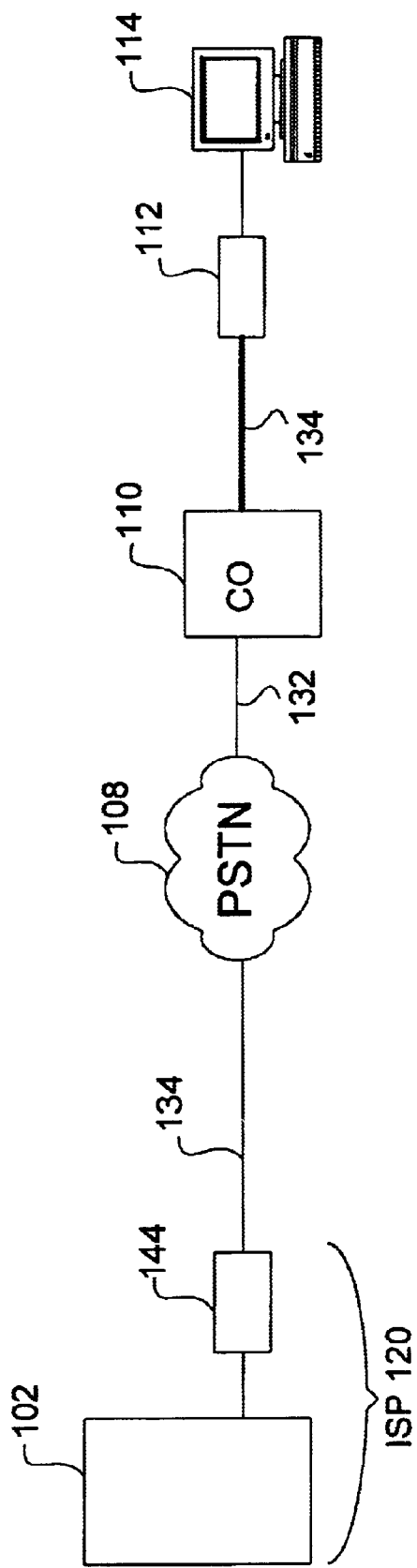
FIG. 1 shows a system in which a standard 56 K modem may be employed.
Figure 2:
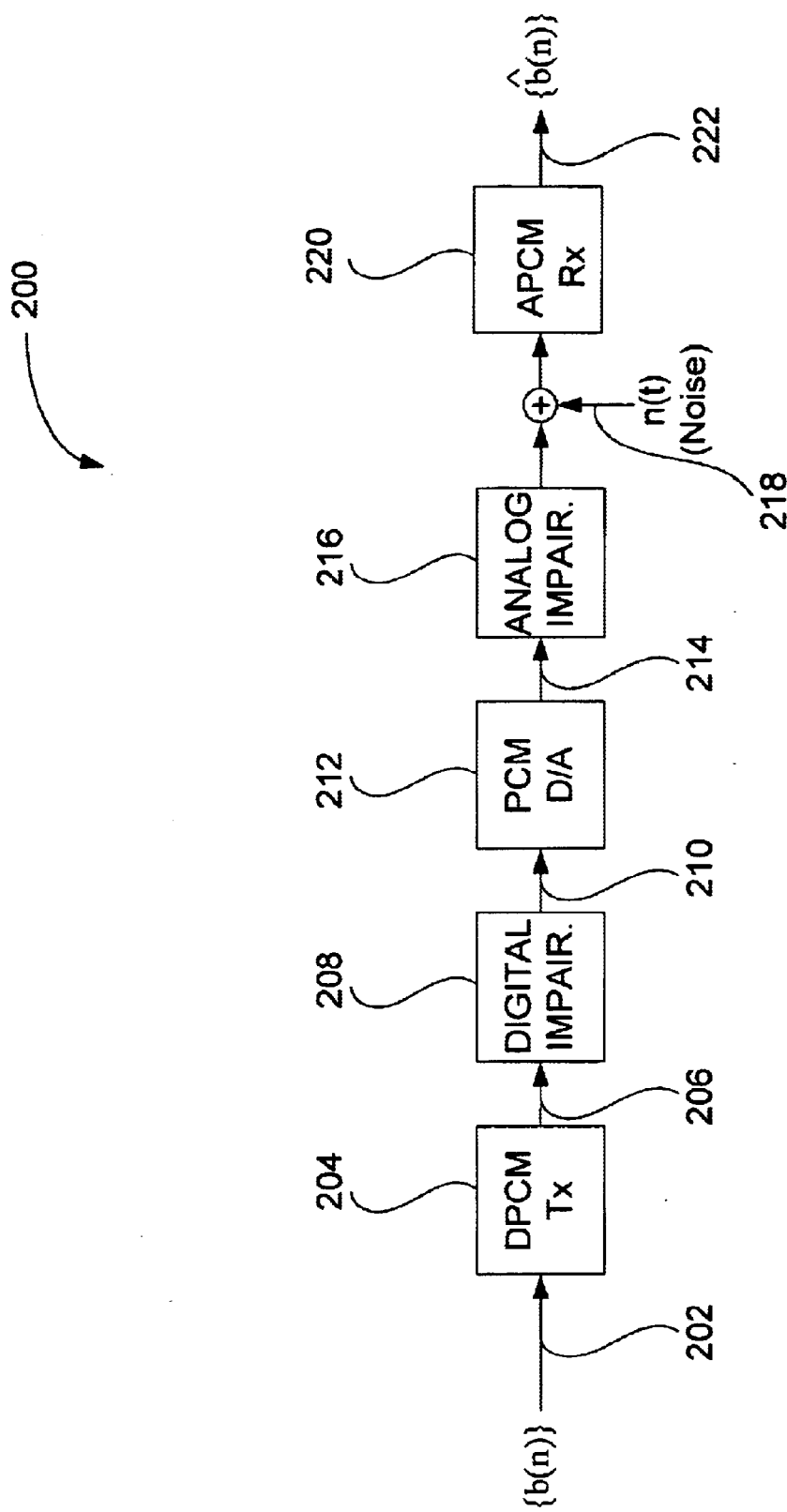
FIG. 2 shows a block diagram of a typical V.90 modem downstream transmission channel.

While being transmitted, digital impairments such as RBS and digital pads may affect the training sequence, and the training sequence is eventually converted to an analog signal for transmission over the local loop, wherein the digital to analog conversion may be performed by, for example, codec 212 shown in FIG. 2.

Due to the nature of the transmission channel, APCM 300 receives an analog representation of the training signal (which is a sequence of digital symbols) transmitted by the DPCM. APCM receiver 300 may include or be associated with a linear analog to digital converter (ADC) 301, which is configured to reverse the digital to analog conversion and mapping of codec 212. ADC 301 may be associated with a PCM codec or any suitable operating element of the data communication system. Accordingly, during a task 704, ADC 301 (or any suitable analog-to-digital converter) preferably converts the received analog signal into an equivalent sequence of finite precision (e.g., 16-bit digital symbols) $r(n)$. This received sequence may be considered to be an impaired sequence of digital symbols, i.e., the converted sequence of digital symbols will likely be affected by RBS and/or digital pads. This sequence of digital symbols may then be equalized by a suitable equalizer structure to produce an equalized output $z(n)$.

The equalizer structure is preferably configured to compensate for transmission channel characteristics such as analog impairments. The equalizer structure may be an adaptive equalizer structure having adjustable parameters, e.g., filter taps, that control the operation of the equalizer structure. In the illustrated embodiment, the equalizer structure comprises a feed-forward equalizer 302 and decision feedback equalizer 306. Such pre-cursive and post-cursive equalization techniques are known to those skilled in the art. In general, the equalizer structure may be realized by any number of filter components. For example, equalizer 204 may include a feedforward equalizer (FFE), a decision feedback equalizer (DFE), a noise predictor (NPD), or the like, or any suitable combination of such components. Such components may be fractionally spaced or T-spaced, depending on the specific application. These, and other equalizer and filter arrangements known to those skilled in the art, may be employed in the context of the present invention. A number of such prior art elements are described in detail in ADAPTIVE FILTER THEORY (3rd ed. 1996) by Simon Haykin, the entire contents of which are incorporated herein by reference.

Referring again to FIG. 3, a task 706 causes the equalizer structure to suitably equalize the impaired sequence to obtain a corresponding sequence of equalized digital symbols. Following the equalization task, process 700 proceeds to compensate for the presence of digital impairments (e.g., RBS and digital pads) This compensation preferably begins with a task 708, which downsamples the digital symbols produced by FFE 302 using any convenient downsampling.

In the illustrated embodiment, it is preferred that FFE 302 and DFE 306 comprise various filter taps which have been previously trained using a suitable training procedure, for example, a two-point training procedure as set forth in the V.90 specification. For more information regarding such a procedure, See, e.g., U.S. application Ser. No. 08/969,971, filed Sep. 8, 1998. Thus, at this point in process 700, it is assumed that compensation for analog impairments (216 in FIG. 2) has been substantially accomplished.

During normal operation, and during the two-point training sequence, slicer 304 generates an output that best approximates the current input symbol. In an ideal optimized system, the input and the output to slicer 304 are substantially close and, consequently, the decision error e(n) would resemble the channel noise. However, due to the practical nature of the data communication system, some amount of decision error will be present (e.g., error caused by additive noise or imperfections in the equalization process). The decision error is utilized to adaptively adjust FFE 302 and DFE 306 during an initial training sequence in an attempt to optimize the performance of APCM receiver 300. Demapper 308 functions to demap the symbol d(n) to the resultant bit stream b(n).

Returning now to digital impairments, in practical V.90 modem systems, RBS occurring in the digital portion of the transmission channel periodically affects the least significant bit of transmitted symbols. In most cases, RBS forces the least significant bit of the affected symbol to either zero or one. Thus, an RBS-affected codeword may be received as if it were one level less than the transmitted level. Furthermore, RBS is a periodic phenomena in practical systems, i.e., if the symbol at time index $n=n_0$ is affected, then the symbol at time index $n=n_0+M$ (where M is equal to, for example, 6, 12, 24, etc.) will also be affected. Thus, RBS affects a transmitted sequence of digital symbols in a periodic manner based on a period of N symbols.

In task 710, sample magnitudes are estimated based on the samples which were downsampled in the previous task. In accordance with various aspects of the present invention, sample magnitudes are, in general, estimated using an algorithm based on minimizing the mean square of the estimated errors. The manner in which this task is performed is described in detail below; however, in one embodiment, an optimum least-squares algorithm is employed. In an alternate embodiment, a least mean squares (LMS) or normalized LMS algorithm is employed.

In current V.90 modem systems that operate in conjunction with practical telecommunication networks, RBS is based on a period of six symbols (or an integer multiple of six symbols). RBS is a deterministic (but unknown to the receiver) digital impairment in that once its presence and period are known, the effect it has on any transmitted symbol can be determined. To this end, task 710 preferably determines estimated sample magnitudes for each of the possible RBS symbol positions, or "phases." As a result, a matrix of values is populated during training.

In this regard, it is instructive to review the manner in which the digital impairment learning (DIL) is performed in an exemplary V.90 system. Section 8.4.1 of the V.90 specification sets forth details related to the DIL descriptor as defined in Section 8.3.1. Briefly, the DIL includes N DIL-segments of length $L_c$, where the number of levels, N, is between 0 and 255 inclusive, and where $1 \leq c \leq 8$, and $L_c=(H_c+1)*6$ symbols. Eight $H_c$ values are used to calculate the length of the DIL-segments containing training symbols.

Eight Ucodes, $REF_c$ (or $Ref_i$, as designated below) define the PCM codeword used as a reference symbol in the various DIL-segments, where the Ucode is the universal code used to describe both u-law and A-law PCM codewords (Table 1/V.90). A sign pattern (SP) and training pattern (TP) is used for the DIL. An SP bit determines the sign of a transmitted symbol (where 0 is negative, and 1 is positive). A TP bit determines whether the reference symbol or a training symbol (designated $B_i^l$ below) is transmitted (0 for reference, 1 for training symbol). The LSB of each pattern applies to the first symbol of a DIL-segment, where the pattern length is between 1 and 128, inclusive, for both $L_{SP}$ and $L_{TP}$.

The patterns are restarted at the beginning of each DIL-segment and repeated independently within segments whose lengths exceed $L_{SP}$ or $L_{TP}$. The sequence is repeated until either the analog modem causes it to be terminated or a timeout occurs. A set of N Ucodes are used for training symbols, where the first Ucode specifies the training symbol for the first DIL-segment, the second Ucode is used for the second DIL-segment, and so on. Additional details related to the DIL sequence may be found in the V.90 specification.

In accordance with the illustrated embodiment, a task 712 builds a constellation based on the estimated samples determined in task 710. The manner in which the system builds the constellation may vary depending upon the particular goals and constraints that apply. For example, the constellation may be configured in accordance with the "minimum distance" between points, signal-to-noise ratio, and or power limit considerations. These and many other criterion for selecting constellations from a particular symbol subset are well known in the art.

Next, in task 714, the constellation built in task 712 is transmitted to the DPCM (204 in FIG. 2). This task may be performed using any convenient method. In the illustrated embodiment, the constellation information is transmitted to the DPCM in accordance with the V.90 specification. The resultant constellation allows the DPCM to transmit data to the APCM such that the digital impairment is partially eliminated or compensated.

Derivation of Optimum Least-Squares Estimation Algorithm

Having thus given an overview of an exemplary system in accordance with the present invention, a detailed derivation and explanation of various methods for determining estimated sample magnitudes (task 710 in FIG. 7) will now be set forth. As a preliminary matter, it will first be assumed that the analog channel can be compensated reasonably well by a well-designed equalizer (such as FSE+DFE/NPD equalizer). The training sequences for PCM level estimation are to be sent on a group of M samples (where M is, for example, a multiple of 6) for each PCM level. The signs of the training sequence for each block is assumed to be random (or pseudo random). This sequence can be repeated for all blocks or each block may use a different binary sequence. As will be shown, the repetitive sequence may have a computational advantage over a totally random sequence.

Figure 4:
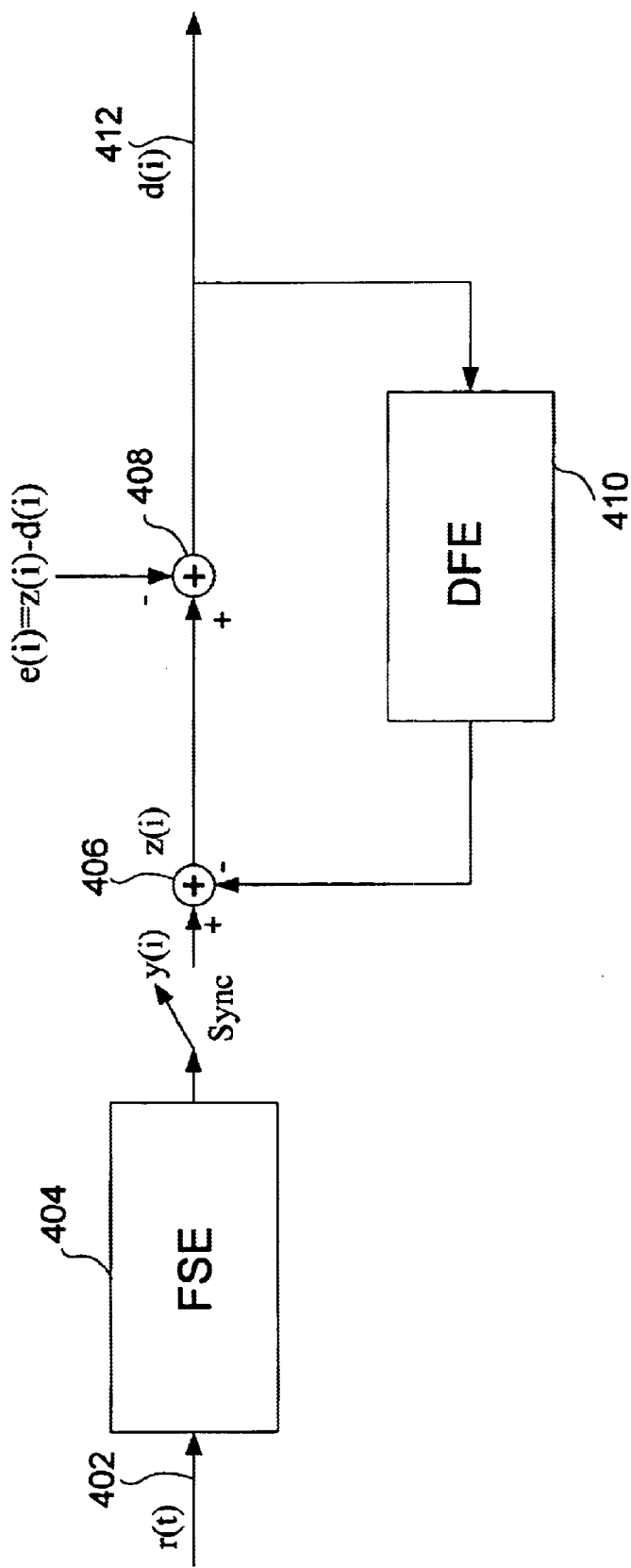
FIG. 4 shows an exemplary FSE+DFE equalizer block-diagram.

Begin with a derivation of the PCM level estimation algorithm based on a FSE+DFE structure as illustrated in FIG. 4, which includes FSE 404, DFE 410, and summers 406 and 408. The received signal r(t) 402 is over-sampled and passed through FSE 404. The output of FSE 404 is down-sampled to T-space samples denoted by {y(i)}, where T is the symbol length.

In such a case, a number of digital impairment learning (DIL) sequences may be appropriate, in an exemplary embodiment, the following DIL sequence is used:

| | $Ref_{i_s}$ | $Ref_{i_s}$ | $Ref_{i_s}$ | $Ref_{i_s}$ | $Ref_{i_s}$ | $Ref_{i_s}$ |
|---|---|---|---|---|---|---|
| $L_i^t/6$ | $Ref_{i_s}$ | $Ref_{i_s}$ | $Ref_{i_s}$ | $Ref_{i_s}$ | $Ref_{i_s}$ | $Ref_{i_s}$ |
| — | . | | | | | |
| | . | | | | | |
| $L_i/6$ | $B_i^l$ | $B_i^l$ | $B_i^l$ | $B_i^l$ | $B_i^l$ | $B_i^l$ |
| | $B_i^l$ | $B_i^l$ | $B_i^l$ | $B_i^l$ | $B_i^l$ | $B_i^l$ |
| | . | | | | | |
| | . | | | | | |
| — | $B_i^l$ | $B_i^l$ | $B_i^l$ | $B_i^l$ | $B_i^l$ | $B_i^l$ |

Where $L_i$ is the length of the DIL segment, $L_i^r$ is the length of the reference point "header," $B_i^l$ is the PCM codeword of the lth level on the ith segment, $\text{Ref}_i$ is a known reference value. The transmitter works from left to right, and top to bottom, with respect to order of symbols sent in the illustrated matrix. The known reference value might be, for example, zero, or may correspond to the two-point training symbol. In this setup, the $\text{Ref}_i$ points are necessary for the optimal least-squares method described below, but may be used for other purposes, e.g., to update timing recovery circuitry or equalizer values. It will be appreciated that these reference points (which by definition are known), can be used as an initial guess for LMS or normalized LMS algorithms.

For the least-squares solutions, we start to form the necessary vector or matrix when receiving $B_i^l$. Specifically, let the DFE 410 taps be $\{b_1\}, l=1,2,\ldots,L$, the estimated symbols be $\{d(i)\}$ 412, and the estimation errors be $\{e(i)\}$. Since a typical RBS frame contains 6 samples, we may decompose the incoming samples into six branches (like a single-input/multiple-output (SIMO) system) and define the following vectors of interest, $$Y(k)=[y(6k+5),y(6k+4),\ldots,y(6k)]^T,$$

$$E(k)=[e(6k+5),e(6k+4),\ldots,e(6k)]^T,$$

$$C=[C_0,C_1,C_2,C_3,C_4,C_5]^T$$

where $C_l$ is the magnitude of the l-th sample in a RBS frame. Let $s(i)=\text{sign}[d(i)]$ and define a $6\times(L+6)$ as:

$$B = \begin{vmatrix} 0 & 0 & 0 & 0 & 0 & 1 & b_1 & \ldots & b_1 \\ 0 & 0 & 0 & 0 & 1 & b_1 & \ldots & b_1 & 0 \\ 0 & 0 & 0 & 1 & b_1 & b_2 & \ldots & 0 & 0 \\ 0 & 0 & 1 & b_1 & b_2 & \ldots & 0 & 0 & 0 \\ 0 & 1 & b_1 & b_2 & b_3 & \ldots & 0 & 0 & 0 \\ 1 & b_1 & b_2 & b_3 & \ldots & 0 & 0 & 0 & 0 \end{vmatrix}$$

and $(L+6)\times 6$ a sparse matrix as $$S(k) = \begin{pmatrix} 0 & 0 & 0 & 0 & 0 & s(6k+5) \\ 0 & 0 & 0 & 0 & s(6k+4) & 0 \\ 0 & 0 & 0 & s(6k+3) & 0 & 0 \\ 0 & 0 & s(6k+2) & 0 & 0 & 0 \\ 0 & s(6k+1) & 0 & 0 & 0 & 0 \\ s(6k) & 0 & 0 & 0 & 0 & 0 \\ 0 & 0 & 0 & 0 & 0 & s(6k-1) \\ \vdots & \vdots & \vdots & \vdots & \vdots & \vdots \\ s(6k-L) & 0 & 0 & 0 & 0 & 0 \end{pmatrix}.$$

Note that the matrix B described above should not be confused with the $B_i^l$ levels described above in connection with the DIL sequence. Continuing, the estimation error vector in a training block can be expressed as $$E(k)=Y(k)-BS(k)C$$

and the least-square solution of C can be derived by minimizing the sum of squares or mean squares of the estimated errors, i.e., $$J(C) = \sum_{k=1}^{K} \|E(k)\|^2$$

where $K=(L_i-(L_i^r-L))/6$, Note that the method of least squares involves the use of time averages and the solution is given by $$C=R^{-1}p$$

where $$R = \frac{1}{K}\sum_{k=1}^{K} S^T(k)B^T BS(k) \text{ and}$$

$$p = \frac{1}{K}\sum_{k=1}^{K} S^T(k)B^T Y(k).$$

The estimation result of C depends on the number of samples used in the computation. In some cases, an adaptive algorithm might be desired, such as the recursive least-squares (RLS) algorithm or its variations (e.g., QR-based algorithms). The RLS algorithm computes the updated estimate of the C vector at time k upon the arrival of new data vector, given the least-squares estimate of the PCM level vector at k−1. Note also that the RLS algorithm can be viewed as a special case of the Kalman filter.

In general, the calculation of C involves matrix multiplies and accumulates and an inversion of a 6×6 matrix R. Since the matrix R is Toplitz, only upper (or lower) triangle of the matrix needs to be computed and stored. If a common binary training sequence for each PCM level is used for all blocks (a repetitive sequence), the matrices R and $S^T(k)B^T$ need to be calculated only once for all PCM level estimates because it only depends on the DFE taps and signs of the training sequences. Further, since the matrix S(k) is a sparse matrix (only ⅙ non-zero elements), R and p can be easily computed.

A further reduction in computation is possible if a pre-classification procedure is performed on the elements in C before estimating PCM levels. For example, if there is no RBS present in the channel, i.e., $C_0=C_i, i=1,\ldots,5$, then $$c_0 = \frac{\sum_{l=1}^{6} p_l}{\sum_{i,j=1}^{6} R_{i,j}}.$$

If one sample in each RBS frame is robbed, then R is reduced to a 2×2 matrix and p becomes 2×1 vector, and so on. Generally speaking, post-classification of C may result in a slight performance loss because it ignores correlation between the elements in C when we estimate them.

Finally, a carefully designed, "good," binary training sequence may result in a matrix of R close to diagonal and numerical instability of the algorithm might be minimized.

Figure 5:
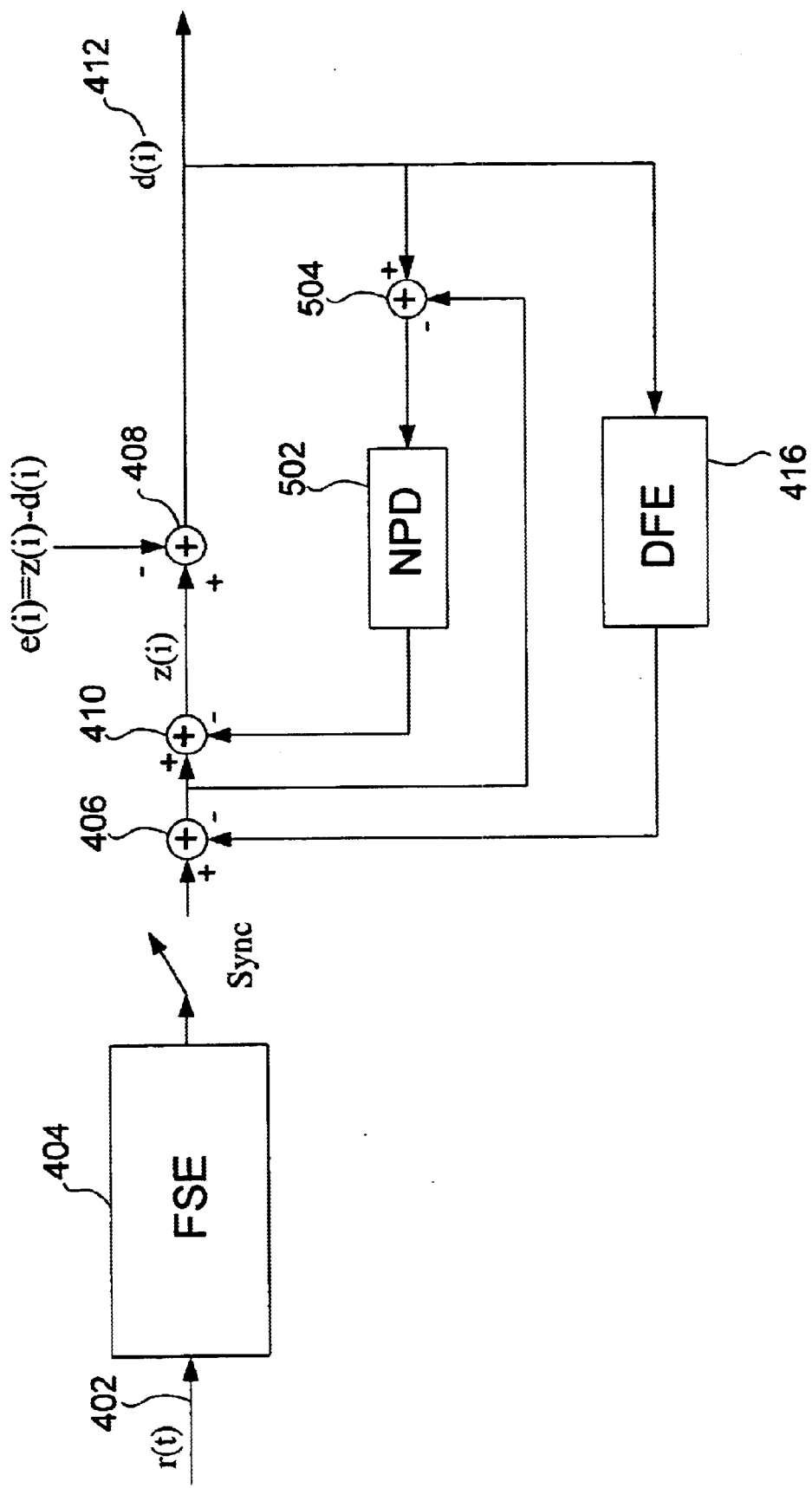
FIG. 5 shows an exemplary FSE+DFE/NPD equalizer block diagram.
Figure 6:
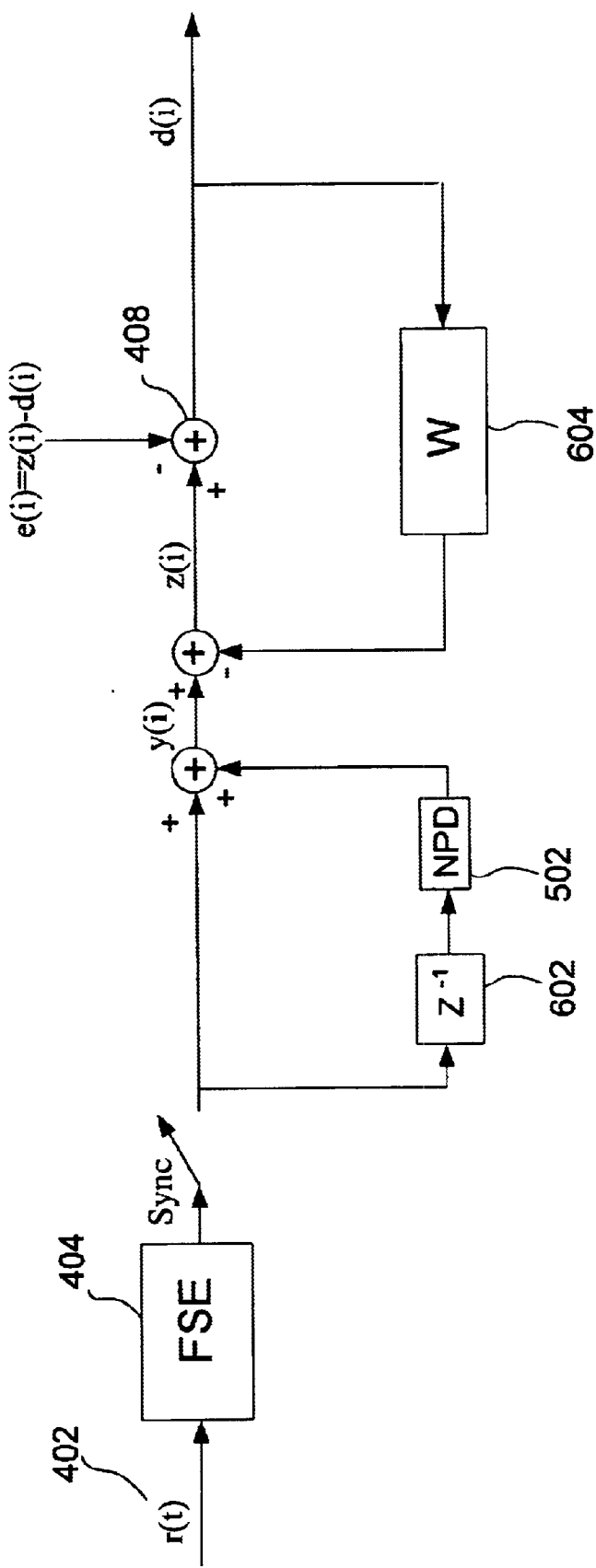
FIG. 6 shows an alternate block diagram configuration for that shown in FIG. 5.

The aforementioned estimation algorithm can be easily extended to a FSE+DFE/NPD structure as shown in FIG. 5, which further includes a noise-predictor 502 (NPD) and summer 504. Let the taps of NPD 512 be denoted by $\{q_i\}_{i=1}^{N}$ and define a new $(L+N-1)\times 1$ filter coefficient vector as $$w=[b^T,0^T]+[q^T,0^T]^T+[0,b^T \otimes q^T]^T$$

where $\otimes$ denotes the vector convolution. Then the equalizer in FIG. 5 can be simplified as in FIG. 6 and the proposed algorithm can be adopted. More particularly, a $Z^{-1}$ block 602, an NPD 502, and a W block 604 are configured as shown.

Derivation of LMS Estimation Algorithm

Having thus derived the optimum least-squares solution, an estimation algorithm that provides excellent performance while reducing complexity will now be derived. To derive an LMS algorithm, we may either minimize the squared instantaneous estimation error vector $\|E(k)\|^2$ at frame k (vector LMS) or the squared scalar error element $[e(6k+i)]^2$ at time $(6k+i)$ (scalar LMS).

An example DIL sequence for the described LMS method is as follows:

| | | | | | | | |
|---|---|---|---|---|---|---|---|
| — | $Ref_{i_s}$ | $Ref_{i_s}$ | $Ref_{i_s}$ | $Ref_{i_s}$ | $Ref_{i_s}$ | $Ref_{i_s}$ | |
| | $Ref_{i_s}$ | $Ref_{i_s}$ | $Ref_{i_s}$ | $Ref_{i_s}$ | $Ref_{i_s}$ | $Ref_{i_s}$ | |
| | $B_i^1$ | $Ref_{i_s}$ | $Ref_{i_s}$ | $Ref_{i_s}$ | $Ref_{i_s}$ | $Ref_{i_s}$ | — |
| | $Ref_{i_s}$ | $B_i^1$ | $Ref_{i_s}$ | $Ref_{i_s}$ | $Ref_{i_s}$ | $Ref_{i_s}$ | |
| | $Ref_{i_s}$ | $Ref_{i_s}$ | $B_i^1$ | $Ref_{i_s}$ | $Ref_{i_s}$ | $Ref_{i_s}$ | Initialize |
| | $Ref_{i_s}$ | $Ref_{i_s}$ | $Ref_{i_s}$ | $B_i^1$ | $Ref_{i_s}$ | $Ref_{i_s}$ | $(c_0, \ldots c_5)$ |
| $L_i/6$ | $Ref_{i_s}$ | $Ref_{i_s}$ | $Ref_{i_s}$ | $Ref_{i_s}$ | $B_i^1$ | $Ref_{i_s}$ | |
| | $Ref_{i_s}$ | $Ref_{i_s}$ | $Ref_{i_s}$ | $Ref_{i_s}$ | $Ref_{i_s}$ | $B_i^1$ | — |
| | $Ref_{i_s}$ | $Ref_{i_s}$ | $Ref_{i_s}$ | $Ref_{i_s}$ | $Ref_{i_s}$ | $Ref_{i_s}$ | |
| | $B_i^1$ | $B_i^1$ | $B_i^1$ | $B_i^1$ | $B_i^1$ | $B_i^1$ | |
| | $B_i^1$ | $B_i^1$ | $B_i^1$ | $B_i^1$ | $B_i^1$ | $B_i^1$ | |
| | . | | | | | | |
| | . | | | | | | |
| | . | | | | | | |
| — | $B_i^1$ | $B_i^1$ | $B_i^1$ | $B_i^1$ | $B_i^1$ | $B_i^1$ | |

Given, a DIL as shown above, If the vector LMS approach is used, the level estimate vector is first updated as:

$$C(k+1) = C(k) + \mu E^T(k) S^T(k) W^T$$

where $\mu$ is the step size parameter, and $C(k)$ is the vector of the PCM symbol to be estimated at the kth frame. $C(0)$ is preferably set to an initial value. While $C(0)$ may be set to zero, this choice can lead to unsatisfactory convergence times. A better solution, referring now to the previously shown DIL sequence, is to utilize the first portion of the DIL signal to derive reasonable initial values for $(C_o, C_1, \ldots C_5)$. Thus, for example, a value $B_i^I$ may be placed sparsely in the sequence as shown to estimate each of the six phases (rows 3–8), afterwhich, starting at row 10, the value of k can be reset to zero. The system then proceeds to estimate the levels in accordance with the initial estimate of the C vector, thus reducing convergence time greatly.

Returning to the derivation, if the scalar-LMS is used, the level estimate vector can be adapted as:

$$C(6k+i+1) = C(6k+i) + \mu e(6k+i)[S^T(k)W^T]_i$$

where [B]i denotes the ith column of the matrix B. The instantaneous error can be calculated using newly available level estimates in a round-robin fashion. In one embodiment, the present inventors have found that the normalized-LMS is particularly suitable as it exhibits minimum change in a Euclidean norm sense with respect to the known estimate $C(n)$ at time n. Additionally, the selection of step-size is less sensitive to the analog channel characteristics.

In sum, the scalar version of normalized LMS is given by:

$$C(6k+i+1) = C(6k+i) + \mu e(6k+i)[S^T(k)W^T]_i / \|[S^T(k)W^T]_i\|^2$$

and the vector version is given by $$C(k+1) = C(k) + \mu E^T(k) S^T(k) W^T / \|S^T(k)W^T\|^2$$

Where the normalized step-size must satisfy $0 \leq \mu < 2$.

In an alternate embodiment, a mapping procedure is defined whereby a signal x is selected every N samples. Then N samples are derived from this signal for transmission based on a particular rule or function. For example, given a signal x, we may select 4 transmit samples as (x,x,−x,−x). If the signals x are selected randomly, the transmitted signal for this mapping procedure will have spectral nulls at DC and 1/2T. In the case of 1/T=8 kHz, the nulls would be at 0 and 4 kHz. This greatly simplifies equalization such that feedback is not required.

To identify impairments, the system first transmits an appropriate equalizer training signal using a mapping procedure as described above, based on randomly selected signals x and −x. A FFE is trained based on this sequence. As the training progresses, samples affected by RBS are identified. Typically, samples are affected by RBS in frame sizes of six. The slicing errors in frame positions affected by RBS are then not used for training to avoid tap noise that is otherwise generated because of the uncertainty of the proper slicer level. Once the equalizer is trained to a suitable level, the update is disabled, and a multilevel signal is transmitted. This multi-level signal is modulated using the same mapping procedure as the equalizer training signal. The symbols are selected in such a way that the receiver may estimate which transmit samples are separable in the receiver. Once the receiver is discarded and a new training signal is transmitted—where feedback is now used—taking advantage of the knowledge gained about the constellation.

In yet another embodiment, the feedback solution would involve essentially introducing "new" points in a controlled manner. If a signal point $Ref_i$, is known perfectly, and a DFE/NP equalizer has been trained up using that point, a signal point B can be sent once, producing a sequence such as $Ref_{i,}$ $Ref_{i,}$ $Ref_{i,}$ $Ref_{i, +sc\ B}$, $Ref_{i,}$ $Ref_{i,}$ $Ref_{i,}$ $Ref_{i,}$. When B is first received, the system simply passes it to the DFE delay line without slicing, and calculates the error for the NP delay line correspondingly. No equalizer update need be performed. The error in subsequent A's can then be examined to refine the estimate of B based on what is in the DFE and NP delay lines. After several samples have passed, the system can send B again and repeat the process, gradually reducing the interval between B's. For example, the system could transmit the pattern that follows (split up into RBS frames):

| | | | | | |
|---|---|---|---|---|---|
| $Ref_{i,}$ | $Ref_{i,}$ | $Ref_{i,}$ | $Ref_{i,}$ | $Ref_{i,}$ | $Ref_{i,}$ |
| $B_i^1$ | $Ref_{i,}$ | $Ref_{i,}$ | $Ref_{i,}$ | $Ref_{i,}$ | $Ref_{i,}$ |
| $Ref_{i,}$ | $B_i^1$ | $Ref_{i,}$ | $Ref_{i,}$ | $Ref_{i,}$ | $Ref_{i,}$ |
| $Ref_{i,}$ | $Ref_{i,}$ | $B_i^1$ | $Ref_{i,}$ | $Ref_{i,}$ | $Ref_{i,}$ |
| $Ref_{i,}$ | $Ref_{i,}$ | $Ref_{i,}$ | $B_i^1$ | $Ref_{i,}$ | $Ref_{i,}$ |
| $Ref_{i,}$ | $Ref_{i,}$ | $Ref_{i,}$ | $Ref_{i,}$ | $B_i^1$ | $Ref_{i,}$ |
| $Ref_{i,}$ | $Ref_{i,}$ | $Ref_{i,}$ | $Ref_{i,}$ | $Ref_{i,}$ | $B_i^1$ |
| $Ref_{i,}$ | $Ref_{i,}$ | $Ref_{i,}$ | $Ref_{i,}$ | $Ref_{i,}$ | $B_i^1$ |
| $Ref_{i,}$ | $Ref_{i,}$ | $Ref_{i,}$ | $Ref_{i,}$ | $B_i^1$ | $Ref_{i,}$ |
| $Ref_{i,}$ | $Ref_{i,}$ | $Ref_{i,}$ | $B_i^1$ | $Ref_{i,}$ | $Ref_{i,}$ |
| $Ref_{i,}$ | $Ref_{i,}$ | $B_i^1$ | $Ref_{i,}$ | $Ref_{i,}$ | $Ref_{i,}$ |
| $Ref_{i,}$ | $B_i^1$ | $Ref_{i,}$ | $Ref_{i,}$ | $Ref_{i,}$ | $Ref_{i,}$ |
| $B_i^1$ | $Ref_{i,}$ | $Ref_{i,}$ | $Ref_{i,}$ | $B_i^1$ | $Ref_{i,}$ |
| $B_i^1$ | $Ref_{i,}$ | $Ref_{i,}$ | $Ref_{i,}$ | $Ref_{i,}$ | $Ref_{i,}$ |
| $B_i^1$ | $Ref_{i,}$ | $Ref_{i,}$ | $Ref_{i,}$ | $B_i^1$ | $Ref_{i,}$ |
| $Ref_{i,}$ | $Ref_{i,}$ | $B_i^1$ | $Ref_{i,}$ | $Ref_{i,}$ | $Ref_{i,}$ |
| $B_i^1$ | $Ref_{i,}$ | $Ref_{i,}$ | $Ref_{i,}$ | $Ref_{i,}$ | $B_i^1$ |
| $Ref_{i,}$ | $B_i^1$ | $Ref_{i,}$ | $Ref_{i,}$ | $Ref_{i,}$ | $Ref_{i,}$ |
| $Ref_{i,}$ | $B_i^1$ | $Ref_{i,}$ | $B_i^1$ | $Ref_{i,}$ | $Ref_{i,}$ |
| $Ref_{i,}$ | $B_i^1$ | $Ref_{i,}$ | $Ref_{i,}$ | $B_i^1$ | $Ref_{i,}$ |
| $Ref_{i,}$ | $B_i^1$ | $Ref_{i,}$ | $Ref_{i,}$ | $B_i^1$ | $Ref_{i,}$ |
| $B_i^1$ | $Ref_{i,}$ | $Ref_{i,}$ | $Ref_{i,}$ | $B_i^1$ | $Ref_{i,}$ |

In this case, there are four occurrences of B in each RBS frame, or a total of 24. Half would actual use +B, the other half −B. If this were done for each point, the length of the training signal would be 1.9 seconds. Afterwhich, all signal points could be transmitted randomly to refine the estimates.

The present invention has been described above with reference to a preferred embodiment. However, those skilled in the art will recognize that changes and modifications may be made to the preferred embodiment without departing from the scope of the present invention. For example, the various adaptive algorithm expressions may be implemented in alternate ways depending upon the particular application or in consideration of any number of cost functions associated with the operation of the system. In addition, the techniques described herein may be extended or modified for use with other adaptively trainable components in a digital data communication system. These and other changes or modifications are intended to be included within the scope of the present invention, as expressed in the following claims.

What is claimed is:

1. A method of creating a constellation for use by a first modem to compensate for digital impairments in a communication channel between said first modem and a second modem, said method comprising:

training an equalizer having a feedforward portion and a feedback portion to yield feedforward and feedback tap values;

receiving an analog representation of a digital impairment learning (DIL) by said first modem via said communication channel, said DIL including a plurality of segments, each of said plurality of segments being characterized by a PCM level, a PCM reference and a sign pattern;

converting said analog representation of said DIL to generate a digital representation of said DIL;

equalizing said digital representation of said DIL, using said equalizer, to generate equalized segments;

arranging said equalized segments into a sequence of signal vectors;

selecting level estimates to minimize a sum of squared errors, wherein said errors are based on differences between said signal vectors and a product of said feedforward and feedback tap values, values of said sign pattern and said level estimates; and defining a constellation based on said estimated sample magnitudes.

2. The method of claim 1 further comprising:

transmitting information relating to said constellation to said second modem; and receiving data by said first modem from said second modem based on said constellation.

3. The method of claim 1, wherein said equalizer is trained based on a two-point training.

4. The method of claim 1, wherein said digital impairments include robbed-bit-signaling and digital pads.

5. The method of claim 1, wherein said digital impairments include robbed-bit-signaling, and wherein said estimating estimates said magnitudes for each of robbed-bit-signaling symbol position.

6. A modem capable of creating a constellation compensating for digital impairments in a communication channel between said modem and a remote device, said modem comprising:

a receiver configured to receive an analog representation of a digital impairment learning (DIL) via said communication channel, said DIL including a plurality of digital symbols, wherein said plurality of segments, each of said plurality of segments being characterized by a PCM level, a PCM reference and a sign pattern;

an analog to digital converter configured to convert said analog representation of said DIL to generate a digital representation of said DIL; and an equalizer configured to equalize said digital representation of said DIL obtained from said converter to generate equalized segments, said equalizer having a feedforward portion and a feedback portion, wherein said equalizer is trained, prior to said receiver receiving said analog representation of a training sequence, to yield feedforward and feedback tap values;

wherein said modem arranges said equalized segments into a sequence of signal vectors, selected level estimates to minimize a sum of squared errors, wherein said errors are based on differences between said signal vectors and a product of said feedforward and feedback tap values, values of said sign pattern and said level estimates, and wherein said modem defines a constellation based on said estimated sample magnitudes.

7. The modem of claim 6, further comprising:

a transmitter configured to transmit information relating to said constellation to said remote device;

wherein said receiver is configured to receive data from said remote device based on said constellation.

8. The modem of claim 6, wherein said equalizer is trained based on a two-point training signal.

9. The modem of claim 6, wherein said digital impairments include robbed-bit-signaling and digital pads.

10. The modem of claim 6, wherein said digital impairments include robbed-bit-signaling, and wherein said modem estimates said magnitudes for each of robbed-bit-signaling symbol position.

11. A method of creating a constellation for use by a first modem to compensate for digital impairments in a communication channel between said first modem and a second modem, said method comprising:

training an equalizer having a feedforward portion and a feedback portion to yield feedforward and feedback tap values;

receiving an analog representation of a digital impairment learning (DIL) by said first modem via said communication channel, said DIL including a plurality of segments, each of said plurality of segments being characterized by a PCM level, a PCM reference and a sign pattern;

converting said analog representation of said DIL to generate a digital representation of said DIL;

equalizing said digital representation of said DIL, using said equalizer, to generate equalized segments;

arranging said equalized segments into a sequence of signal vectors;

selecting level estimates to minimize a sum of squared errors, wherein said errors are based on differences between said signal vectors and a product of said feedforward and feedback tap values, values of said sign pattern, said level estimates and error values, wherein said error values are based on differences between said signal vectors and a product of said feedforward and feedback tap values, values of said sign pattern and previous or current said level estimates; and defining a constellation based on said estimated sample magnitudes.

12. The method of claim 11 further comprising:
transmitting information relating to said constellation to said second modem; and
receiving data by said first modem from said second modem based on said constellation.

13. The method of claim 11, wherein said equalizer is trained based on a two-point training.

14. The method of claim 11, wherein said digital impairments include robbed-bit-signaling and digital pads.

15. The method of claim 11, wherein said digital impairments include robbed-bit-signaling, and wherein said estimating estimates said magnitudes for each of robbed-bit-signaling symbol position.

16. A modem capable of creating a constellation compensating for digital impairments in a communication channel between said modem and a remote device, said modem comprising:

a receiver configured to receive an analog representation of a digital impairment learning (DIL) by said first modem via said communication channel, said DIL including a plurality of digital symbols, wherein said plurality of segments, each of said plurality of segments being characterized by a PCM level, a PCM reference and a sign pattern;

an analog to digital converter configured to convert said analog representation of said DIL to generate a digital representation of said DIL; and an equalizer configured to equalize said digital representation of said DIL obtained from said converter to generate equalized segments, said equalizer having a feedforward portion and a feedback portion, wherein said equalizer is trained, prior to said receiver receiving said analog representation of a training sequence, to yield feedforward and feedback tap values;

wherein said modem arranges said equalized segments into a sequence of signal vectors, selects level estimates to minimize a sum of squared errors, wherein said errors are based on differences between said signal vectors and a product of said feedforward and feedback tap values, values of said sign pattern, said level estimates and error values, wherein said error values are based on differences between said signal vectors and a product of said feedforward and feedback tap values, values of said sign pattern and previous or current said level estimates, and wherein said modem defines a constellation based on said estimated sample magnitudes.

17. The modem of claim 16 further comprising:

a transmitter configured to transmit information relating to said constellation to said remote device;

wherein said receiver is configured to receive data from said remote device based on said constellation.

18. The modem of claim 16, wherein said equalizer is trained based on a two-point training signal.

19. The modem of claim 16, wherein said digital impairments include robbed-bit-signaling and digital pads.

20. The modem of claim 16, wherein said digital impairments include robbed-bit-signaling, and wherein said modem estimates said magnitudes for each of robbed-bit-signaling symbol position.

* * * * *

UNITED STATES PATENT AND TRADEMARK OFFICE
CERTIFICATE OF CORRECTION

PATENT NO. : 6,721,279 B1
DATED : April 13, 2004
INVENTOR(S) : Zhang et al.

It is certified that error appears in the above-identified patent and that said Letters Patent is hereby corrected as shown below:

Column 11,
Lines 45-46, reading "estimated sample magnitudes" should read -- level estimates --.

Column 12,
Lines 21 and 66-67, reading "estimated sample magnitudes" should read -- level estimates --.

Column 14,
Lines 15-16, reading "estimated sample magnitudes" should read -- level estimates --.

Signed and Sealed this

Third Day of August, 2004

JON W. DUDAS
*Acting Director of the United States Patent and Trademark Office*